United States Patent
Dafoe et al.

(10) Patent No.: US 11,018,343 B1
(45) Date of Patent: May 25, 2021

(54) CURRENT COLLECTOR SURFACE TREATMENT

(71) Applicant: Apple Inc., Cupertino, CA (US)

(72) Inventors: Donald G. Dafoe, San Jose, CA (US); Qingcheng Zeng, San Jose, CA (US); Kenzo Nagai, Fremont, CA (US)

(*) Notice: Subject to any disclaimer, the term of this patent is extended or adjusted under 35 U.S.C. 154(b) by 106 days.

(21) Appl. No.: 15/962,133

(22) Filed: Apr. 25, 2018

Related U.S. Application Data

(60) Provisional application No. 62/513,566, filed on Jun. 1, 2017.

(51) Int. Cl.
| | |
|---|---|
| *H01M 6/12* | (2006.01) |
| *H01M 4/66* | (2006.01) |
| *H01M 10/02* | (2006.01) |
| *H01M 10/0525* | (2010.01) |
| *H01M 10/0585* | (2010.01) |

(52) U.S. Cl.
CPC ........... *H01M 4/667* (2013.01); *H01M 4/661* (2013.01); *H01M 10/02* (2013.01); *H01M 10/0525* (2013.01); *H01M 10/0585* (2013.01)

(58) Field of Classification Search
CPC ...... H01M 4/667; H01M 4/661; H01M 10/02; H01M 10/0525; H01M 10/0585
See application file for complete search history.

(56) References Cited

U.S. PATENT DOCUMENTS

| | | |
|---|---|---|
| 4,374,186 A | 2/1983 | McCartney et al. |
| 4,567,119 A | 1/1986 | Lim |
| 5,162,172 A | 11/1992 | Kaun |
| 5,254,415 A | 10/1993 | Williams et al. |
| 5,367,431 A | 11/1994 | Kunishi et al. |

(Continued)

FOREIGN PATENT DOCUMENTS

| | | |
|---|---|---|
| CN | 101809801 A | 8/2010 |
| CN | 102272977 A | 12/2011 |

(Continued)

OTHER PUBLICATIONS

Europe Patent Application No. 16738994.9, "Communication Pursuant to Rules 161(1) and 162 EPC", dated Mar. 23, 2018, 3 pages.

(Continued)

*Primary Examiner* — Jane J Rhee
(74) *Attorney, Agent, or Firm* — Kilpatrick Townsend & Stockton

(57) ABSTRACT

Energy storage devices, battery cells, and batteries of the present technology may include a first current collector, and may include a second current collector. At least one of the first current collector and the second current collector may be a metal current collector. The battery cells may include a seal between an external region of the first current collector and an external region of the second current collector. The seal may be coupled with a first portion of a first surface of the first current collector, and may be coupled with a first portion of a first surface of the second current collector. The battery cells may also include a coupling material positioned between the seal and the first portion of the first surface of the first current collector. The coupling material may also be positioned between the seal and the first portion of the first surface of the second current collector.

18 Claims, 3 Drawing Sheets

(56) References Cited

U.S. PATENT DOCUMENTS

| | | | |
|---|---|---|---|
| 6,004,698 | A | 12/1999 | Richards et al. |
| 8,357,469 | B2 | 1/2013 | Shaffer, II et al. |
| 9,142,811 | B2 | 9/2015 | Chami |
| 2002/0146620 | A1 | 10/2002 | Connell |
| 2003/0027051 | A1 | 2/2003 | Kejha et al. |
| 2005/0106456 | A1 | 5/2005 | Puester et al. |
| 2009/0068531 | A1 | 3/2009 | Sawa et al. |
| 2009/0136832 | A1* | 5/2009 | Mitsuda .............. H01G 9/016 429/94 |
| 2009/0233175 | A1 | 9/2009 | Kelley et al. |
| 2010/0134942 | A1 | 6/2010 | Wang et al. |
| 2011/0294007 | A1 | 12/2011 | Hosaka et al. |
| 2012/0156552 | A1 | 6/2012 | Miyazaki et al. |
| 2012/0189896 | A1 | 7/2012 | Zhou et al. |
| 2013/0065106 | A1 | 3/2013 | Faust et al. |
| 2013/0089774 | A1 | 4/2013 | Chami |
| 2015/0325894 | A1 | 11/2015 | Merriman et al. |
| 2016/0049679 | A1 | 2/2016 | Stevens et al. |
| 2016/0099456 | A1 | 4/2016 | Kwon et al. |
| 2016/0197352 | A1 | 7/2016 | Blaser et al. |
| 2016/0248113 | A1 | 8/2016 | He et al. |
| 2016/0329535 | A1 | 11/2016 | Moommaw et al. |
| 2017/0214057 | A1 | 7/2017 | Kotik et al. |
| 2018/0013144 | A1 | 1/2018 | Li et al. |
| 2018/0226654 | A1 | 8/2018 | Ohsawa et al. |

FOREIGN PATENT DOCUMENTS

| | | |
|---|---|---|
| CN | 103165920 A | 6/2013 |
| CN | 103222098 A | 7/2013 |
| CN | 103548196 A | 1/2014 |
| CN | 103904294 A | 7/2014 |
| CN | 107851747 A | 3/2018 |
| EP | 2892097 A1 | 7/2015 |
| EP | 3317907 A | 5/2018 |
| JP | 06503442 A | 4/1994 |
| JP | 2005005163 A | 1/2005 |
| JP | 2006012556 A | 1/2006 |
| JP | 2007012584 A | 1/2007 |
| JP | 2011071011 A | 4/2011 |
| JP | 4857710 B2 | 1/2012 |
| JP | 2012234823 A | 11/2012 |
| JP | 2013114746 A | 6/2013 |
| JP | 2013187074 A | 9/2013 |
| JP | 5410822 B2 | 2/2014 |
| JP | 2014029818 A | 2/2014 |
| JP | 2018519646 | 7/2018 |
| KR | 20130066795 A | 6/2013 |
| WO | 8504287 A1 | 9/1985 |
| WO | 9210861 A1 | 6/1992 |
| WO | 2016031689 A1 | 3/2016 |
| WO | 2017007827 | 1/2017 |
| WO | 2017007827 A1 | 1/2017 |
| WO | 2018057566 A1 | 3/2018 |
| WO | 2018195372 A1 | 10/2018 |
| WO | 2018213601 A2 | 11/2018 |

OTHER PUBLICATIONS

Japan Patent Application No. 2018-500449, "Office Action", dated Jan. 21, 2019, 12 pages.
PCT/US2016/041151, "International Preliminary Report on Patentability", dated Jan. 18, 2018, 8 pages.
PCT/US2016/041151, "International Search Report and Written Opinion", dated Aug. 25, 2016, 10 pages.
PCT/US2017/052413, "International Search Report and Written Opinion", dated Feb. 1, 2018, 19 pages.
PCT/US2017/052413, "Invitation to Pay Additional Fees", dated Dec. 8, 2017, 14 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
Korean Patent Application No. 10-2018-7000263, "Office Action", dated Feb. 28, 2019, 5 pages.
Korea Patent Application No. 10-2018-7000263, "Office Action", dated Sep. 27, 2019, 16 pages.
PCT/US2018/028472, "International Preliminary Report on Patentability", dated Oct. 31, 2019, 10 pages.
U.S. Appl. No. 15/742,009, "Non-Final Office Action", dated Nov. 15, 2019, 14 pages.
Japan Patent Appl. No. 2018-500449, "Notice of Decision to Grant", dated Nov. 18, 2019, 2 pages.
PCT/US2018/033218, "International Preliminary Report on Patentability", dated Nov. 28, 2019, 9 pages.
U.S. Appl. No. 15/742,009, "Restriction Requirement", dated Jun. 11, 2019, 8 pages.
International Patent Application No. PCT/US2017/052413, "International Preliminary Report on Patentability", dated Apr. 4, 2019, 12 pages.
Chinese Patent Application No. 201680039891.9, "Office Action", dated Jan. 6, 2020, 21 pages.
U.S. Appl. No. 16/108,498, "Non-Final Office Action", dated Apr. 30, 2020, 28 pages.
U.S. Appl. No. 16/273,625, "Non-Final Office Action", dated May 4, 2020, 54 pages.
Chinese Patent Application No. 201680039891.9, "Office Action", dated Jan. 6, 2020, 23 pages.
Korean Patent Application No. 10-2018-7000263, "Notice of Decision to Grant", dated Apr. 8, 2020, 2 pages.
U.S. Appl. No. 16/007,534, "Non-Final Office Action", dated May 5, 2020, 47 pages.
U.S. Appl. No. 16/049,250, "Non-Final Office Action", dated Apr. 8, 2020, 8 pages.
U.S. Appl. No. 16/263,890, "Non-Final Office Action", dated Jun. 16, 2020, 9 pages.
U.S. Appl. No. 15/742,009, "Final Office Action", dated Aug. 19, 2020, 13 pages.
U.S. Appl. No. 16/049,250, "Notice of Allowance", dated Oct. 7, 2020, 7 pages.
U.S. Appl. No. 16/108,503, "Non-Final Office Action", dated Oct. 2, 2020, 11 pages.
U.S. Appl. No. 16/108,522, "Non-Final Office Action", dated Sep. 9, 2020, 10 pages.
U.S. Appl. No. 16/263,890, "Notice of Allowance", dated Oct. 23, 2020, 8 pages.
China Patent Application No. 201680039891.9, "Office Action", dated Jun. 10, 2020, 18 pages.
European Patent Application No. 16738994.9, "Notice of Decision to Grant", dated Sep. 24, 2020, 2 pages.
U.S. Appl. No. 16/038,865, "Non-Final Office Action", dated Nov. 6, 2020, 13 pages.

* cited by examiner

CURRENT COLLECTOR SURFACE TREATMENT

CROSS REFERENCE TO RELATED APPLICATION

This application claims the benefit of U.S. Provisional Application Ser. No. 62/513,566, filed Jun. 1, 2017, the entire disclosure of which is hereby incorporated by reference for all purposes.

TECHNICAL FIELD

The present technology relates to batteries and battery components. More specifically, the present technology relates to battery cell components with materials to assist component coupling.

BACKGROUND

In batteries and battery cells, coupling of metal and non-metal materials may be difficult. Additionally, materials used to assist in component coupling may react adversely with the electrolyte in a completed cell. Improved designs and processes are needed.

SUMMARY

The present technology relates to energy storage devices, including battery cells and batteries, which may include lithium-ion batteries having a variety of shapes including stacked cells, which may be or include bipolar batteries as well as batteries stacked in any orientation including vertical and horizontal, for example. These devices may include current collectors configured based on a z-direction transmission of current through the cell components, although current collectors configured based on an xy-directional transmission of current may also benefit from the present designs. The batteries and cells may include a host of features and material configurations as will be described throughout the disclosure.

Energy storage devices, battery cells, and batteries of the present technology may include a first current collector, and may include a second current collector. At least one of the first current collector and the second current collector may be a metal current collector. The battery cells may include a seal between an external region of the first current collector and an external region of the second current collector. The seal may be coupled with a first portion of a first surface of the first current collector, and may contact a first portion of a first surface of the second current collector. The battery cells may also include a coupling material positioned between the seal and the first portion of the first surface of the first current collector. The coupling material may also be positioned between the seal and the first portion of the first surface of the second current collector.

In some embodiments, an anode active material may be located in contact with the first surface of the first current collector at a second portion of the first current collector. A cathode active material may be located in contact with the first surface of the second current collector at a second portion of the second current collector. A third portion of the first current collector may be located between the first portion of the first current collector and the second portion of the first current collector. The coupling material may extend from the first portion of the first current collector within the third portion of the first current collector along the first surface of the first current collector. The coupling material may extend towards the second portion of the first current collector while being maintained within the third portion of the first current collector. The coupling material may not contact the anode active material on the first surface of the first current collector in embodiments.

The second current collector may be characterized by a third portion of the second current collector located between the first portion of the second current collector and the second portion of the second current collector. The coupling material may extend from the first portion of the second current collector into the third portion of the second current collector without extending into the second portion of the second current collector. The first current collector and the second current collector may both be or include metal current collectors. The coupling material may include chromium. The seal may be or include a polymer.

The present technology additionally encompasses current collectors. The current collectors may include an active material disposed on an interior region of the current collector. The current collectors may include a seal disposed along an exterior region of the current collector. The current collectors may also include a coupling material included on the current collector between the seal and the current collector. The coupling material may be maintained outside of the interior region of the current collector.

In some embodiments, the current collector may be characterized by a rectangular shape. The coupling material may be disposed on the current collector framing the interior region of the current collector. A gap may be maintained along the current collector between an interior edge of the coupling material and an exterior edge of the interior region. The coupling material may be characterized by a length greater than a length of the seal. The coupling material may include a chromate moiety. The coupling material may be inert to and chemically stable with respect to electrolyte materials that may include a lithium-ion salt. The current collector may be or include a metal, and in some embodiments, the metal may be selected from the group including one or more of copper, aluminum, or stainless steel. The seal may be or include a polymer, and in embodiments may include polypropylene.

The present technology also encompasses battery cells. The battery cells may include a first current collector, which may be or include a first metal. The battery cells may include a first active material extending along a first surface of the first current collector. The battery cells may include a second current collector, which may be or include a second metal. The battery cells may include a second active material extending along a first surface of the second current collector. The battery cells may include a multi-part seal including a first seal component disposed on the first surface of the first current collector and a second seal component disposed on the first surface of the second current collector. The battery cells may also include a coupling material positioned at a first location between the first seal component and the first current collector and positioned at a second location between the second seal component and the second current collector. In some embodiments, the coupling material may not contact the first active material or the second active material.

Such technology may provide numerous benefits over conventional technology. For example, the present devices may provide improved lamination of seal components with current collectors. Additionally, the designs may reduce the interaction of coupling materials with electrode active materials. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
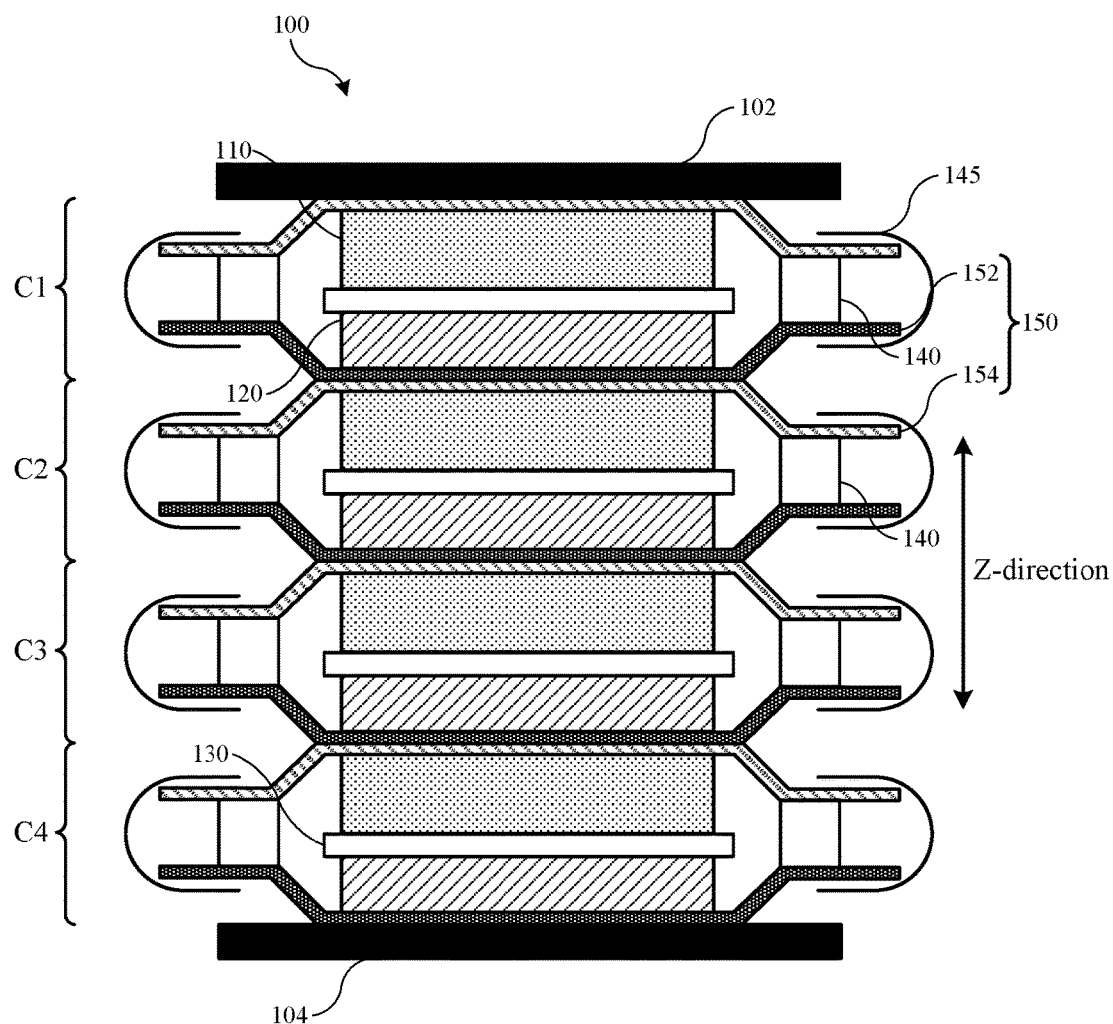
FIG. 1 shows a schematic cross-sectional view of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may include many different materials joined in one or more ways. Some components of an exemplary device may be metal, while other components coupled with these metal components may be non-metal, such as a polymer, for example. When metal and non-metal components are joined or coupled, one or more surfaces of the materials may be treated to facilitate coupling. Conventional technologies may, for example, treat a surface of the metal component with a material that enables the non-metal material to attach to the metal component. Without a coupling material, delamination can occur between components, which can cause battery malfunction or failure. However, testing has shown that some materials that may enable metal and non-metal coupling may not be chemically stable within a battery.

For example, the materials may react with electrode active materials or electrolytic components of the device, which may impair performance of the battery, or initiate degradation of the cell. For example, when these coupling materials are included between a current collector and an active material layer, the coupling materials may react with the active material. These reactions may consume components of the active material, degrading the overall capacity for the cell. Additionally, either the coupling material or the reacted species may reduce electronic mobility between the active material and the current collector. When this occurs, cell resistance may increase, which may in turn reduce the efficiency and performance of the battery.

The present technology addresses many of these issues by providing a layer of coupling material along a current collector between two dissimilar components, such as a metal and a non-metal component, while limiting interaction of the coupling material with active material. By distributing the coupling material in a limited region, reactions between the coupling material and other cell components can be limited or prevented. Additionally, by maintaining the material outside of active material regions, cell resistance can be reduced, which may improve battery performance.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
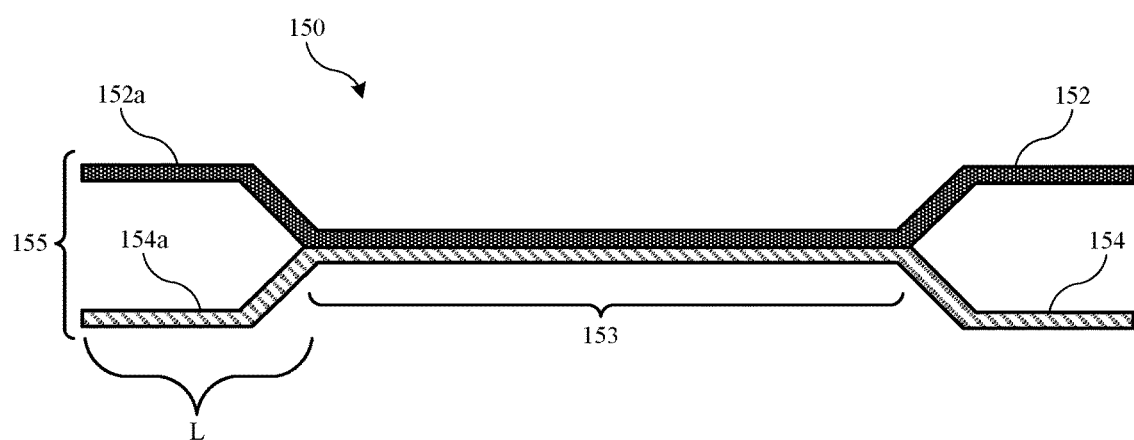
FIG. 2 shows a schematic cross-sectional view of a current collector according to embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152a and 154a may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^{-4}$ ohm-m in embodiments. Additionally, exemplary current collectors may have an in-plane and through-plane resistivity of between about $1 \times 10^{-3}$ ohm-m and about 1,000 ohm-m.

In other embodiments, more conventional electrical distribution may be employed, where current is transferred along conductive current collectors into and out of the cell.

Figure 3:
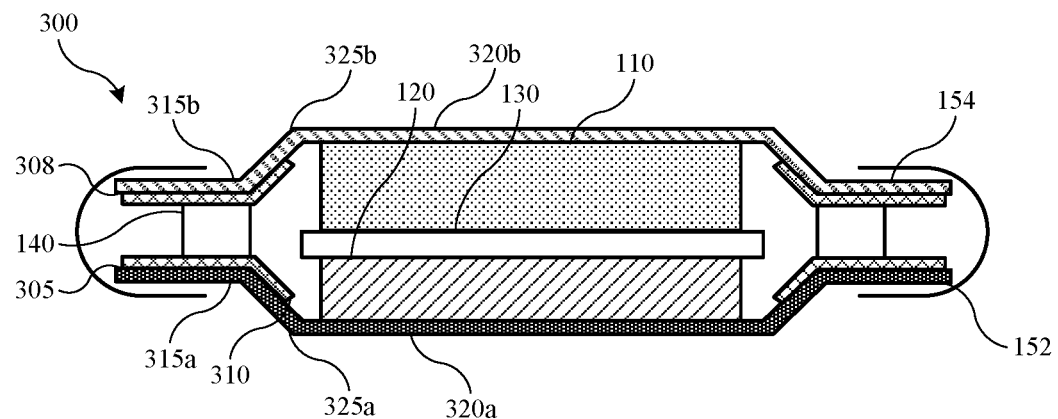
FIG. 3 shows a schematic cross-sectional view of a portion of an energy storage device according to embodiments of the present technology.

Turning to FIG. 3 is shown a schematic cross-sectional view of a portion of an energy storage device 300 according to embodiments of the present technology. As illustrated, energy storage device 300 may include a battery cell, and may include multiple battery cells similar to those discussed above with regard to FIGS. 1 and 2. Energy storage device 300 is shown as a single cell for illustrative purposes, but it is to be understood that energy storage devices encompassed by the present technology may include one or more cells up to hundreds or thousands of coupled cells in some multi-cell battery designs. Similar to FIG. 1, energy storage device 300 may include a number of cells, and each cell may include a first current collector 152 and a second current collector 154. In embodiments, at least one of the first current collector 152 and the second current collector 154 may be a metal current collector, although in embodiments both or neither current collectors may be metal or a conductive material in embodiments. Any of the cell components may be or include any of the materials discussed above with regard to FIGS. 1 and 2.

Additionally within each cell may be electrode components. An anode active material 120 may be disposed on or contact first current collector 152. The anode active material may contact the first surface 305 of first current collector 152. In this way, seal 140 and anode active material 120 may both be in contact or coupled with first surface 305 of first current collector 152. Similarly, a cathode active material 110 may be disposed on or contact second current collector 154. The cathode active material 110 may contact the first surface 308 of second current collector 154, and thus cathode active material 110 and seal 140 may both be in contact or coupled with first surface 308 of second current collector 154. Exemplary cells may also include a separator 130 disposed between anode active material 120 and cathode active material 110.

Each cell of energy storage device 300 may also include a seal 140, which may be located between an external region of the first current collector 152 and an external region of the second current collector 154. Seal 140 may be any of the materials previously described, and may be a polymeric material in embodiments. In some embodiments, seal 140 may be polypropylene. The seal 140 may contact or be coupled with a first portion 315a of first surface 305 of the first current collector 152. The seal 140 may also contact or be coupled with a first portion 315b of first surface 308 of the second current collector 154. The coupling may be direct or indirect in embodiments, and may be indirect coupling as shown, although either current collector may be directly coupled with seal 140 in embodiments. A coupling material 310 may be included in the battery cell, and may be positioned between the seal 140 and the first portion 315a of first surface 305 of the first current collector 152. The coupling material 310 may also be positioned between the seal 140 and the first portion 315b of first surface 308 of the second current collector 154. In some embodiments the coupling material may be included between seal 140 and only one current collector of energy storage device 300, and in embodiments either current collector 152, 154 may include the coupling material 310.

As illustrated with exemplary energy storage device 300, each current collector may include the active material in a specific region of the battery cell. For example, cathode active material 110 may be included in a second portion 320b of current collector 154, and anode active material 120 may be included in a second portion 320a of current collector 152. The second portion 320 of each current collector may be an interior region of the collector structure, and may be defined about a midpoint of each current collector. The active materials may be located in direct contact with the current collectors, although additional components may also be included between the materials. In some embodiments the first surface of each current collector may also include a portion within the cell structure that is uncontacted by either the seal 140 or the active materials.

Third portion 325 of each current collector may be located between the first portion 315 and the second portion 320. Third portion 325a of first current collector 152 and third portion 325b of second current collector 154 may be located along the first surface of the respective current collectors between the seal and the active material. For example, third portion 325a may be located along first surface 305 of first current collector 152 and encompass a region extending between where seal 140 contacts or is coupled with the first surface 305 and where anode active material 120 contacts or is coupled with the first surface 305. Additionally, third portion 325b may be located along first surface 308 of second current collector 154, and encompass a region extending between where seal 140 contacts the first surface 308 and where cathode active material 110 contacts the first surface 308. Third portions 325 may define locations where coupling material 310 may extend, while seal 140 may be maintained in first regions 315 and the active materials may be maintained in second regions 320.

Additionally, a boundary between first portion 315 and third portion 325 of each current collector may be defined by an internal edge of seal 140. In this way, seal 140 may define an edge of third region 325. Similarly, in some embodiments, a boundary between second portion 320 and third portion 325 of each current collector may be defined by an external edge of the associated active material. The active material may then define an opposite edge of third region 325 such that third region 325 may include a portion of each current collector from an edge of seal 140 to an edge of active material along each current collector. As the active materials may not have discreet boundaries, such as may occur with streaking, for example, the associated boundary of third region 325 may be in a location specified by a discontinuous amount of active material, or where active material no longer coats the current collector.

As previously noted, in some embodiments, the current collectors may be a metal material, while the seal 140 may be a polymer. In one non-limiting example, the seal may be polypropylene, and the current collectors may be aluminum and copper respectively, or may both be a similar metal, for example, such as stainless steel. Coupling material 310 may be included along the first surface of one or both current collectors to facilitate the coupling of the seal to the current collector. Coupling material 310 may be included within one or more portions of the current collector as previously identified, and in embodiments may be included at least in first portion 315 of one or both current collectors. Coupling material 310 may be included specifically overlapping where seal 140 may be coupled with the current collector, and in embodiments coupling material 310 may extend at least over a region corresponding to the dimensions of the seal 140.

Seal 140 may extend fully across first portion 315 of each current collector, or may be included within a segment of first portion 315 of each current collector. For example, although an interior edge of seal 140 may define an interior edge of first portion 315 of each current collector, an external edge of first portion 315 may not be so defined. In some embodiments seal 140 may also define an exterior edge of first portion 315, such as in embodiments in which seal 140 extends to an exterior edge of the current collector or device structure. However, in some embodiments, such as is illustrated, seal 140 may extend only partly across first portion 315 towards an exterior edge of the current collectors. Coupling material 310 may extend to an exterior edge of the current collectors, or may extend at least to an exterior edge of seal 140.

As illustrated, coupling material 310 may extend outward along the first surfaces of each current collector beyond an external edge of seal 140. Coupling material 310 may also extend to an exterior edge of each current collector, or may extend towards an exterior edge. By extending beyond an exterior edge of seal 140, an associated coupling between the seal 140 and the current collectors may be consistent. For example, if seal 140 extended beyond an exterior edge of coupling material 310, such a location may provide a weaker bonding or coupling, which may provide a location for delamination, which may facilitate ingress and egress from the interior of the cell, which may reduce operating lifetime of the energy storage device. Second region 320 may be at least partially defined by the active materials, and in embodiments, exterior edges of second region 320 may be associated or coextensive with exterior edges of the active materials, which may also be an interior edge of third portion 325.

Coupling material 310 may extend beyond an interior edge of first portion 310, which may correspond to an interior edge of seal 140. Coupling material 310 may extend from a position within first portion 310, such as a portion external to an exterior edge of seal 140, to a position within third portion 325. Accordingly, coupling material 310 included on either current collector may extend across first portion 310 and within third portion 325 as illustrated along the first surface of the current collector. Again, by extending beyond an interior edge of seal 140, a consistent coupling may be provided between seal 140 and the associated current collectors. FIG. 3 illustrates that coupling material 310 located on current collector 152 and coupling material 310 located on current collector 154 are coextensive in dimensions across the current collectors. This may be based on a particular manufacturing process used for both current collectors, although in other embodiments, the coupling material 310 coverage may be characterized by dissimilar lengths on the respective current collectors if included on both.

Coupling material 310 may be located or extend along the first surface of either current collector towards a central region such as second portion 320 for a particular distance. This distance may extend towards a central location of the current collectors in a first direction, and towards an exterior edge of the current collectors in a second direction opposite the first. As discussed above, coupling material 310 may extend in the second direction up to or towards an exterior edge of the current collectors. In the first direction extending towards the central location of the current collectors, coupling material 310 may extend towards a position on the first surface proximate a position on the first surface on which active material may be located.

Coupling material 310 may extend towards, proximate, or up to active material on either current collector. For example, as illustrated, coupling material 310 may extend along first surface 308 of second current collector 154 in a first direction towards an exterior edge of active material 110. Additionally, coupling material 310 may extend along first surface 305 of first current collector 154 in a first direction towards an exterior edge of active material 120. On both current collectors, the coupling material 310 may extend from first portion 315 into third portion 325, and may specifically extend across a length of seal 140. As illustrated, although coupling material 310 may extend towards either active material, in embodiments coupling material 310 may not extend into second region 320, and in embodiments may be maintained within the third portion 325 of each current collector. The coupling material 310 may not extend to an interior edge of third portion 325, which may be an exterior edge of second portion 320. In this way, in some embodiments coupling material 310 may not contact either anode active material 120 or cathode active material 110 along the first surfaces of the current collectors.

In some embodiments coupling material 310 may extend to or within second portion 320, and may contact at least a portion of active material. However, some exemplary devices may ensure coupling material 310 does not contact active material. As previously discussed, the coupling material may include materials that may chemically react with components of the active material. These reactions may cause the active material to lose capacity, or may prevent a reacted portion of the active material from being utilized during charge and discharge operations, which may reduce the capacity of the battery cell. Thus, a discreet gap may be maintained within third portion 325 between active material extending to the boundary of second portion 320 and third portion 325, and an extent of coverage of coupling material 310.

Coupling material may be included within third portion 325 to any extent from the boundary of first portion 315 and third portion 325. In embodiments, coupling material 310 may extend within third portion 325 from the boundary with first portion 315 less than or about 100% of the distance to the internal boundary of third portion 325 and second portion 320. Also, in some embodiments, coupling material 310 may extend within third portion 325 less than or about 95% of the distance to the internal boundary of third portion 325 and second portion 320, and may extend less than or about 90%, less than or about 85%, less than or about 80%, less than or about 75%, less than or about 70%, less than or about 65%, less than or about 60%, less than or about 55%, less than or about 50%, less than or about 45%, less than or about 40%, less than or about 35%, less than or about 30%, less than or about 25%, less than or about 20%, less than or about 15%, less than or about 10%, less than or about 5%, less than or about 3%, less than or about 1%, or may extend within first portion 310 to the boundary with third portion 325, without further extending into third portion 325. However, as previously discussed, coupling material 310 may extend at least partially into third portion 325 to ensure coverage fully extends across a length of seal 140.

Coupling material 310 may be any material that may facilitate coupling between the seal 140 and the current collectors 152, 154. In embodiments, coupling material may react with one or both active materials, although coupling material 310 may not react with electrolyte components, which may include one or more lithium-ion salts. In some embodiments coupling material 310 may be chemically inert or stable to all internal components of the cell, or may be chemically stable with or inert to electrolyte materials, although not with other components or materials within the cell. In some embodiments, coupling material 310 may be a carbon-based or a silicon-based agent, and may include one or more functional groups to facilitate coupling. For example, coupling material 310 may be adjusted to facilitate coupling with a cathode current collector, which may be aluminum, and may be adjusted differently to facilitate coupling with an anode current collector, which may be copper. In some embodiments the coupling material 310 may be identical for each current collector based on the functional groups, or based on the current collectors, such as if the same material is used for both the cathode current collector and the anode current collector, such as stainless steel, for example.

Coupling material 310 may include particular moieties configured to facilitate coupling of a polymeric material with a metal material, and may include one or more moieties of an anion or oxoanion of a transition metal. For example, although many different transition metals may be used, in some embodiments in which the seal includes polymers as discussed above, the coupling material may include one or more chromium-containing moieties, for example, such as a chromate or dichromate moiety. A length or width of coupling material 310 across a current collector may be variable as discussed previously, but the coupling material may cover up to or more than 500 µm in embodiments, and may be up to, greater than, or about 1 mm, greater than or about 3 mm, greater than or about 5 mm, greater than or about 7 mm, greater than or about 10 mm, greater than or about 15 mm, greater than or about 20 mm, greater than or about 25 mm, greater than or about 30 mm, greater than or about 50 mm, greater than or about 10 cm, greater than or about 50 cm, greater than or about 1 m, or more in embodiments. Depending on the size of the battery cell, the amount of gap area or third portion within which coupling material 310 may be included may be variable.

Figure 4:
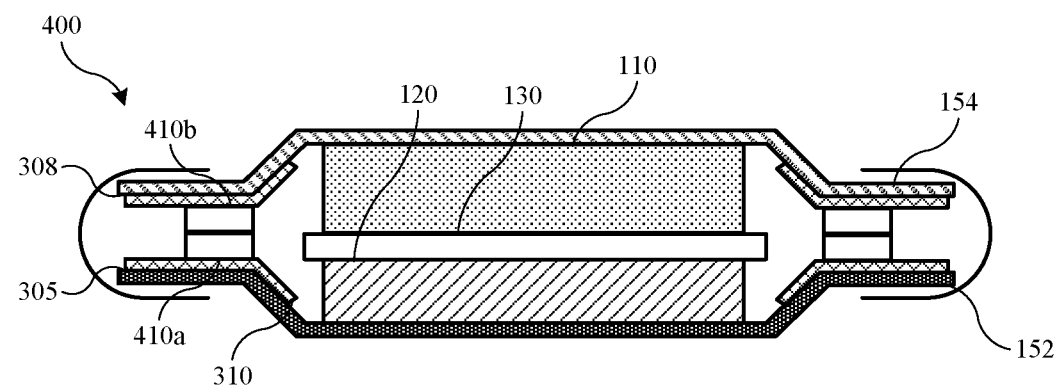
FIG. 4 shows a schematic cross-sectional view of a portion of an energy storage device according to embodiments of the present technology.

Additional energy storage device designs may include alternative seal materials in embodiments. Turning to FIG. 4 is shown a schematic cross-sectional view of a portion of an energy storage device 400 according to embodiments of the present technology. Energy storage device 400 may be similar to energy storage device 300 described above, and may include similar components of a battery cell or cells, including a first current collector 152, a second current collector 154, a first active material 120, a second active material 110, and a separator 130. Energy storage device 400 may also include a coupling material 310 between a seal 410 and one or both of the current collectors 152, 154. Any of the cell components, including coupling material 310, may be or include any of the materials previously described, and may be characterized by any of the properties discussed above. For example, first current collector 152 may be or include a first metal, and second current collector 154 may be or include a second metal. Additionally, first active material 120 may extend along a first surface 305 of the first current collector 152, and second active material 110 may extend along a first surface 308 of the second current collector 154.

As illustrated in FIG. 4, energy storage device 400 may include a multi-part seal 410. Multi-part seal 410 may include at least two separate layers of material as illustrated, although in other embodiments any number of layers may be included. For example, first seal component 410a may be disposed on the first surface 305 of first current collector 152, and second seal component 410b may be disposed on the first surface 308 of second current collector 154. Coupling material 310 may be disposed between each portion of multi-part seal 410 and the respective current collector. For example, coupling material 310 may be positioned at a first location between the first seal component 410a and the first current collector 152, and coupling material 310 may also be positioned at a second location between the second seal component 410b and the second current collector 154. Coupling material 310 may extend along the first surfaces of each current collector as previously described, and in embodiments may not contact either first active material 120 or second active material 110.

Utilizing a multi-part seal 410 may facilitate formation of individual electrode layers in embodiments. For example, in some manufacturing embodiments, individual electrodes may be formed at one point, while completed cells may be formed at a later time, or at a different location. Coupling material 310 may be applied by any number of techniques, such as printing, coating, stamping, or other known techniques. Coupling material 310 may have reduced effectiveness after exposure to an external environment for long periods of time. Accordingly, by forming individual electrodes with a portion of a multi-part seal 410, the coupling material 310 may be used to enable coupling of the metal and non-metal components soon after being applied to the electrode. When cell formation is then performed, such as at a later time, the two or more portions of multi-part seal 410 may be coupled more readily, based on the materials being similar, such as both being polymeric, for example. Accordingly, in such a design, the separate portions of multi-part seal 410 may be heat sealed or bonded to one another at any later time, without concern for a deteriorated coupling material 310 being utilized for one or both seal connections.

Figure 5:
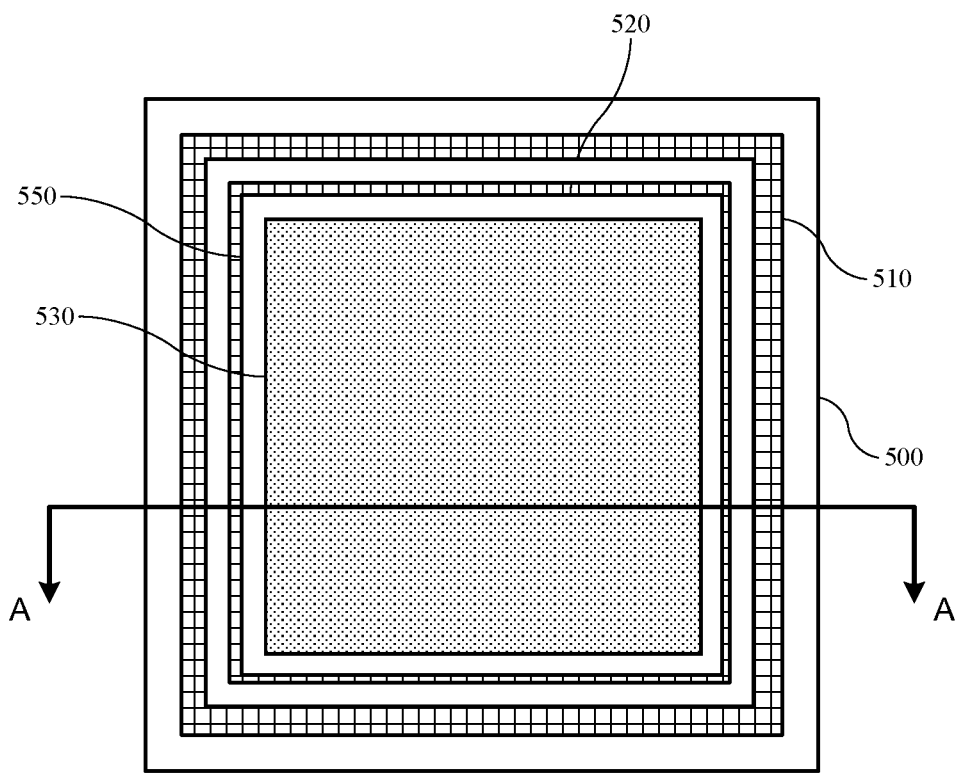
FIG. 5 shows a schematic plan view of an electrode of a battery cell according to embodiments of the present technology.

The coupling materials of the present technology may be deposited or formed on a current collector to cover an area relative to an active material also formed on the electrode. As one example of such a configuration, FIG. 5 shows a plan view of an exemplary current collector 500 according to embodiments of the present technology. Current collector 500 may be similar to any of the current collectors previously described, and may illustrate an example of how a coupling material 510 may be applied to a current collector in the present technology. Any of the previously described components may be utilized with current collector 500, and any of the described components may be characterized by any of the materials, dimensions, or designs previously described. As illustrated, current collector 500 may include an active material 530 disposed on an interior region of the current collector 500. The active material may be any of the previously identified materials, as current collector 500 may be illustrative of either an anode current collector or a cathode current collector.

Figure 6:
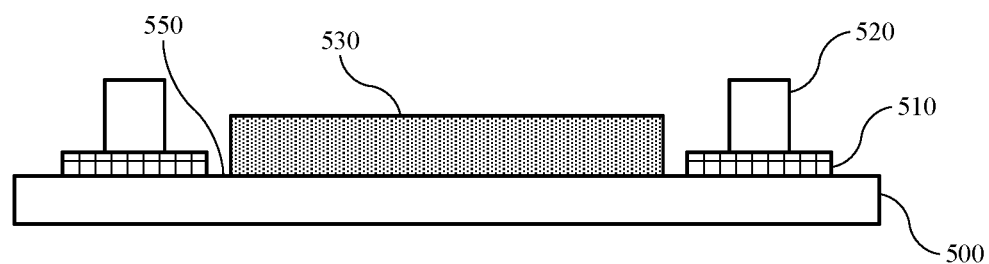
FIG. 6 shows a schematic cross-sectional view of an electrode of a battery cell according to embodiments of the present technology.

Current collector 500 may include a seal 520 disposed along an exterior region of the current collector 500. Current collector 500 may also include a coupling material 510 included on the current collector 500. Coupling material 510 may be included on the current collector between the seal 520 and the current collector 500. The position of the seal 520 on the current collector 500 may also be seen as illustrated in FIG. 6, which may be a cross-sectional view along line A-A of FIG. 5. Coupling material 510 may enable or facilitate a coupling or bonding between current collector 500, which may be metal, and seal 520, which may be a non-metal, such as a polymer. Coupling material 510 may be characterized by a length and/or width greater than a length and/or width of seal 520, which may ensure a consistent coupling across seal 520 with current collector 500. As illustrated in the figures, coupling material 510 may be maintained outside of or external to the interior region, which may be defined by the coverage of active material 530. A gap 550, characterized by any of the previously noted dimensions, may be maintained between active material 530 and coupling material 510 to limit or prevent reaction between the two components.

FIG. 5 illustrates a possible geometry of a current collector according to the present technology, although any other shape or geometry is similarly encompassed by the present technology. Current collector 500 may be rectangular in shape, and each of the components may also be characterized by rectangular shapes. Coupling material 510 may be incorporated or disposed on current collector 500 to frame the internal region in which active material 530 is disposed. As shown, gap 550 is maintained on all sides of the internal region between each external edge of the active material 530 and each internal edge of the coupling material coverage. Accordingly, the gap 550 may ensure contact between the active material 530 and the coupling material 510 does not occur, which may maintain capacity and function of an energy storage device in which current collector 500 is incorporated, by limiting or preventing reaction of the coupling material with the active material.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery cell comprising:
   a first current collector supporting a first active material;
   a second current collector supporting a second active material, wherein at least one of the first current collector and the second current collector comprises a metal current collector;

a seal between an external region of the first current collector and an external region of the second current collector, wherein the seal is coupled with a first portion of a first surface of the first current collector and a first portion of a first surface of the second current collector; and a coupling material positioned between the seal and the first portion of the first surface of the first current collector and positioned between the seal and the first portion of the first surface of the second current collector, wherein the coupling material is positioned on the first current collector and the second current collector to be maintained free from contacting the first active material and the second active material.

2. The battery cell of claim 1, wherein the first active material is an anode active material located in contact with the first surface of the first current collector at a second portion of the first current collector, and wherein the second active material is a cathode active material located in contact with the first surface of the second current collector at a second portion of the second current collector.

3. The battery cell of claim 2, wherein a third portion of the first current collector is located between the first portion of the first current collector and the second portion of the first current collector.

4. The battery cell of claim 3, wherein the coupling material extends from the first portion of the first current collector within the third portion of the first current collector along the first surface of the first current collector.

5. The battery cell of claim 4, wherein the coupling material extends towards the second portion of the first current collector while being maintained within the third portion of the first current collector.

6. The battery cell of claim 5, wherein the coupling material does not contact the anode active material on the first surface of the first current collector.

7. The battery cell of claim 2, wherein the second current collector is characterized by a third portion of the second current collector located between the first portion of the second current collector and the second portion of the second current collector, and wherein the coupling material extends from the first portion of the second current collector into the third portion of the second current collector without extending into the second portion of the second current collector.

8. The battery cell of claim 1, wherein the first current collector and the second current collector both comprise metal current collectors.

9. The battery cell of claim 1, wherein the coupling material comprises chromium.

10. The battery cell of claim 1, wherein the seal comprises a polymer.

11. A battery cell comprising:
a first current collector comprising a first metal;
a first active material extending along a first surface of the first current collector;
a second current collector comprising a second metal;
a second active material extending along a first surface of the second current collector;
a multi-part seal comprising a first seal component disposed on the first surface of the first current collector and a second seal component disposed on the first surface of the second current collector; and
a coupling material positioned at a first location between the first seal component and the first current collector and positioned at a second location between the second seal component and the second current collector, wherein the coupling material does not contact the first active material or the second active material.

12. The battery cell of claim 11, wherein the first seal component is in contact with the second seal component.

13. The battery cell of claim 11, wherein the first current collector and the second current collector are different materials.

14. The battery cell of claim 11, wherein the coupling material comprises chromium.

15. The battery cell of claim 11, wherein the coupling material comprises a chromate moiety.

16. The battery cell of claim 11, wherein the seal comprises a polymer.

17. The battery cell of claim 16, wherein the seal comprises polypropylene.

18. The battery cell of claim 8, wherein the first current collector and the second current collector are different materials.

* * * * *